(12) United States Patent
Zhang et al.

(10) Patent No.: US 10,220,450 B2
(45) Date of Patent: Mar. 5, 2019

(54) VERTICALLY-MOUNTED MILLING CUTTER INSERT AND MULTITOOTH MILLING CUTTER

(71) Applicant: BEIJING WORLDIA DIAMOND TOOLS CO., LTD, Chaoyang District, Beijing (CN)

(72) Inventors: Zongchao Zhang, Beijing (CN); Qi Han, Beijing (CN)

(73) Assignee: BEIJING WORLDIA DIAMOND TOOLS CO., LTD, Beijing (CN)

( * ) Notice: Subject to any disclaimer, the term of this patent is extended or adjusted under 35 U.S.C. 154(b) by 119 days.

(21) Appl. No.: 15/319,113

(22) PCT Filed: Aug. 5, 2016

(86) PCT No.: PCT/CN2016/093628
§ 371 (c)(1),
(2) Date: Dec. 15, 2016

(87) PCT Pub. No.: WO2017/024997
PCT Pub. Date: Feb. 16, 2017

(65) Prior Publication Data
US 2017/0197256 A1    Jul. 13, 2017

(30) Foreign Application Priority Data

Aug. 10, 2015 (CN) .................... 2015 2 0599136 U
Aug. 10, 2015 (CN) .................... 2015 2 0599364 U (51) Int. Cl.
*B23C 5/08* (2006.01)
*B23C 5/20* (2006.01)
(Continued)

(52) U.S. Cl.
CPC ............... *B23C 5/08* (2013.01); *B23C 5/006* (2013.01); *B23C 5/06* (2013.01); *B23C 5/20* (2013.01);
(Continued)

(58) Field of Classification Search
CPC ......... B23C 5/08; B23C 5/2462; B23C 5/241; B23C 5/2472; B23C 2240/12;
(Continued)

(56) References Cited

U.S. PATENT DOCUMENTS 5,716,167 A * 2/1998 Siddle ..................... B23C 5/241
407/36
5,868,529 A * 2/1999 Rothballer ............ B23C 5/2444
407/36
(Continued)

FOREIGN PATENT DOCUMENTS

CN    1196694 A    10/1998
CN    1929945 A    3/2007
(Continued)

OTHER PUBLICATIONS

International Search Report and Written Opinon of the ISA for PCT/CN2016/093628, ISA/CN, dated Oct. 24, 2016.
(Continued)

*Primary Examiner* — Will Fridie, Jr.
(74) *Attorney, Agent, or Firm* — Harness, Dickey & Pierce, P.L.C.

(57) ABSTRACT

The present invention discloses a vertically-mounted milling cutter insert and a multitooth milling cutter, wherein the vertically-mounted milling cutter insert comprises a insert base and a cutter tip unit, the insert base is set with a mounting hole for mounting the vertically-mounted milling cutter insert onto the milling cutter wheel, and the cutter tip unit is mounted on the insert base, and the cutter tip unit has (Continued)

a double-cutter tip structure. In the invention, the vertically-mounted milling cutter insert is positioned via the fitting between a bent-plane structure in the vertically-mounted milling cutter insert and a positioning structure in the milling cutter wheel, and the bent-plane structure will not be abraded in use. Because the bent-plane structure will not be abraded, reliable positioning may be guaranteed when two cutter tips are used.

14 Claims, 7 Drawing Sheets

(51) Int. Cl.
  B23C 5/00       (2006.01)
  B23C 5/06       (2006.01)
  B23C 5/22       (2006.01)
  B23C 5/28       (2006.01)
(52) U.S. Cl.
  CPC .......... B23C 5/2221 (2013.01); B23C 5/2234 (2013.01); B23C 5/28 (2013.01); B23C 2200/0433 (2013.01); B23C 2200/125 (2013.01); B23C 2200/36 (2013.01); B23C 2200/367 (2013.01); B23C 2210/168 (2013.01); B23C 2210/244 (2013.01); B23C 2250/04 (2013.01)
(58) Field of Classification Search
  CPC ...... B23C 2200/0416; B23C 2200/126; B23C 2200/0433; B23C 2210/244; B23C 5/109
  See application file for complete search history.

(56) References Cited

U.S. PATENT DOCUMENTS

| | | | | |
|---|---|---|---|---|
| 6,053,672 A * | 4/2000 | Satran | ........................ | B23C 5/00 407/40 |
| 6,450,738 B1 * | 9/2002 | Ripley | ...................... | B23C 5/28 407/35 |
| 7,878,738 B2 * | 2/2011 | Kammermeier | .......... | B23C 5/06 407/100 |
| 7,887,265 B2 * | 2/2011 | Hecht | ...................... | B23C 5/241 407/37 |
| 8,092,124 B2 | 1/2012 | Spichtinger et al. | | |
| 8,308,398 B2 * | 11/2012 | Hecht | .................... | B23C 5/2406 407/103 |
| 8,454,277 B2 * | 6/2013 | Dudzinsky | .............. | B23C 5/006 407/103 |
| 8,708,617 B2 * | 4/2014 | Choi | ...................... | B23B 27/007 407/103 |
| 9,713,850 B2 * | 7/2017 | Manner | ................. | B23D 77/048 |
| 2005/0023044 A1 * | 2/2005 | Schuffenhauer | ......... | B23C 5/207 175/426 |
| 2007/0127992 A1 * | 6/2007 | Spichtinger | .............. | B23C 5/006 407/39 |
| 2007/0256287 A1 | 11/2007 | Kocherovsky et al. | | |
| 2008/0232910 A1 | 9/2008 | Hecht | | |
| 2008/0240872 A1 * | 10/2008 | Rimet | ................. | B23B 27/1685 407/51 |

FOREIGN PATENT DOCUMENTS

| | | |
|---|---|---|
| CN | 101563179 A | 10/2009 |
| CN | 202428018 U | 9/2012 |
| CN | 204843084 U | 12/2015 |
| CN | 205085448 U | 3/2016 |
| DE | 102005045751 A1 | 3/2007 |
| JP | H11513315 A | 11/1999 |
| JP | 2008500188 A | 1/2008 |
| JP | 2010522095 A | 7/2010 |
| JP | 2014117775 A | 6/2014 |
| WO | WO-2014128689 A1 | 8/2014 |

OTHER PUBLICATIONS

Office Action regarding Japanese Patent Application No. 2017-507873, dated Feb. 6, 2018.

* cited by examiner

VERTICALLY-MOUNTED MILLING CUTTER INSERT AND MULTITOOTH MILLING CUTTER

CROSS-REFERENCE TO RELATED APPLICATIONS

This application is a 371 U.S. National Stage of International Application No. PCT/CN2016/093628, filed Aug. 5, 2016, which claims the benefit of and priority to Chinese Patent Applications Nos. 201520599364.6, filed Aug. 10, 2015 and 201520599136.9, filed Aug. 10, 2015. The entire disclosures of the above applications are incorporated herein by reference.

FIELD OF THE INVENTION

The present invention relates to the technical field of superhard tools, and in particular, to a vertically-mounted milling cutter insert and a multitooth milling cutter employing the above vertically-mounted milling cutter insert.

BACKGROUND OF THE INVENTION

Milling cutter is a rotary cutter with one or more milling cutter inserts, and it is mainly used for machining a flat surface, a stage and a groove, and shaping a surface and cutting off a work piece, etc., on a milling machine by cutting off the margin of the work piece in turn via each milling cutter insert intermittently. In order to recycle the cutter wheel base of the milling cutter, the existing milling cutter often employs a combined structure of a milling cutter insert and a milling cutter.

The current milling cutter inserts often employ a single tip design, because the current milling cutter inserts generally employs a positioning mode by clamping, and if a cutter tip is designed in the clamped part, the clamped site may be abraded, and hence the working reliability of the milling cutter may be affected.

After the milling cutter is mounted onto the main shaft of the milling machine, the main shaft is actuated. With the rotation of the milling cutter wheel, the milling cutter inserts that are mounted onto the outer-ring of the milling cutter may carry out a milling and machining work. The base of a traditional milling cutter usually employs a single structure (e.g., an aluminum alloy structure), and problems of poor positioning or machining deviation, etc., tend to occur in the case of long working time and high working frequency, thus the stability needs to be improved urgently. Moreover, because the positioning structure often employs a positioning mode by clamping, the number of milling cutter insert that can be mounted cannot be further increased under the premise that the reliability is guaranteed, thus the further improvement of the machining efficiency is limited.

SUMMARY OF THE INVENTION

In view of the above problem, the present invention provides a new vertically-mounted milling cutter insert and a multitooth milling cutter.

The present invention provides a vertically-mounted milling cutter insert, which includes an insert base and a cutter tip unit, wherein the insert base is set with a mounting hole for mounting the milling cutter insert onto a milling cutter, the cutter tip unit is mounted on the insert base, and the cutter tip unit has a double-cutter tips structure.

Optionally, the double-cutter tips structure includes a first cutter tip and a second cutter tip, wherein the cross section of the insert base that is vertical to the axis of the mounting hole has four vertexes, the first cutter tip and the second cutter tip are set on two vertexes on the insert base with locations corresponding to each other.

Optionally, the insert base has a first lateral side and a second lateral side opposite to the first lateral side; the first lateral side is set with a first cutter tip supporting surface and a first positioning structure; the first positioning structure is recessed to the inside of the insert base relative to the first cutter tip supporting surface; the second lateral side is set with a second cutter tip supporting surface and a second positioning structure; the second positioning structure is recessed to the inside of the insert base relative to the second cutter tip supporting surface.

Optionally, the first positioning structure and the second positioning structure both have a bent-plane structure.

Optionally, the bent-plane structure includes a first plane and a second plane, wherein the second plane is inclined to the inside of the insert base relative to the first plane.

Optionally, the first plane has a first flat surface and a first curved surface; the first curved surface in the first positioning structure is located between the first cutter tip supporting surface and the first flat surface in the first positioning structure; the first curved surface in the second positioning structure is located between the second cutter tip supporting surface and the first flat surface in the second positioning structure; the second plane has a second flat surface and a second curved surface; the second curved surface in the first positioning structure is located between the first cutter tip supporting surface and the second flat surface in the first positioning structure; the second curved surface in the second positioning structure is located between the second cutter tip supporting surface and the second flat surface in the second positioning structure.

Optionally, the second curved surface is a conical surface with an axis parallel to the axis of the mounting hole.

Optionally, the width of the first plane is ⅓-½ of the base thickness; and/or, the angle between the second plane and the first plane is 10°-30°.

The present invention provides a multitooth milling cutter, which includes a cutter wheel base, a screw assembly and the vertically-mounted milling cutter inserts aforementioned; the cutter wheel base includes a first cutter base and a second cutter base, the first cutter base is connected with the second cutter base, and the vertically-mounted milling cutter insert is set on the second cutter base.

The screw assembly includes a dynamic balance adjusting screw and a mounting and positioning screw set, the dynamic balance adjusting screw is set on the first cutter base, and the vertically-mounted milling cutter insert is connected with the second cutter base via the mounting and positioning screw set.

The second cutter base includes: an insert mounting groove for mounting the vertically-mounted milling cutter insert, a first screw hole set on the bottom side of the insert mounting groove, and an alternate groove with the insert mounting groove.

When the vertically-mounted insert is mounted in the insert mounting groove, an unused cutter tip structure is located in the alternate groove; the positioning structure includes a first positioning plane located on the lateral side of the insert mounting groove and a second locking screw mounted on the lateral side of the insert mounting groove; the cutter base includes a second screw hole fitting the second locking screw; the axis of the second screw hole is parallel to the axis of the first screw hole.

The present invention provides a multitooth milling cutter, which includes a cutter wheel base, a screw assembly and a vertically-mounted milling cutter insert, wherein the cutter wheel base includes a first cutter base and a second cutter base, the first cutter base is connected with the second cutter base, and the vertically-mounted milling cutter insert is set on the second cutter base; wherein the screw assembly includes a dynamic balance adjusting screw and a mounting and positioning screw set, the dynamic balance adjusting screw is set on the first cutter base, and the vertically-mounted milling cutter insert is connected with the second cutter base via the mounting and positioning screw set.

Optionally, the mounting and positioning screw set includes a first locking screw and a second locking screw; wherein the first locking screw matches the mounting hole of the vertically-mounted milling cutter insert and mounts the vertically-mounted milling cutter insert onto the second cutter base;

the second locking screw matches the first positioning structure or the second positioning structure of the vertically-mounted milling cutter insert and positions the relative locations of the vertically-mounted milling cutter insert and the second cutter base.

Optionally, the hardness of the first cutter base is lower than that of the second cutter base.

The vertically-mounted milling cutter insert provided by the invention is a double-cutter tip structure, and it is positioned by the fitting between a bent-plane structure and a positioning structure in the milling cutter, and the bent-plane structure will not be abraded in use. Because the bent-plane structure will not be abraded, reliable positioning may be guaranteed when two cutter tips are used.

In the multitooth milling cutter provided by the invention, the cutter wheel base has a positioning structure that fits the bent-plane structure in the vertically-mounted milling cutter insert and projects relative to the alternate groove, so that each cutter tip of the double-head milling cutter insert may be positioned accurately in application

BRIEF DESCRIPTION OF THE DRAWINGS

In order to more clearly illustrate the technical solutions of the embodiments of the invention or of the prior art, the drawings needed in the description of the embodiments or the prior art will be briefly introduced below. Apparently, the drawings in the description below are only some embodiments of the invention, and other drawings may also be obtained by one of ordinary skills in the art according to these drawings without creative work.

In the drawings, 1: insert base, 11: mounting hole, 12: first lateral side, 13: second lateral side, 14: first cutter tip supporting surface, 15: first positioning structure, 16: second cutter tip supporting surface, 17: second positioning structure, A: first plane, A1: first flat surface, A2: first curved surface, B: second plane, B1: second flat surface, B2: second curved surface, 2: first cutter tip, 3: second cutter tip; 4: cutter wheel base, 41: first cutter base, 42: second cutter base, 43: insert mounting groove, 44: first screw hole, 45: second screw hole, 46: alternate groove, 47: first positioning plane, 48: coolant liquid spray plate, 5: vertically-mounted milling cutter insert, 6: first locking screw, 7: second locking screw, 8: dynamic balance adjusting screw.

DETAILED DESCRIPTION OF THE EMBODIMENTS

The technical solutions in the embodiments of the invention will be illustrated in detail below in conjunction with the drawings in the embodiments of the invention.

Figure 1:
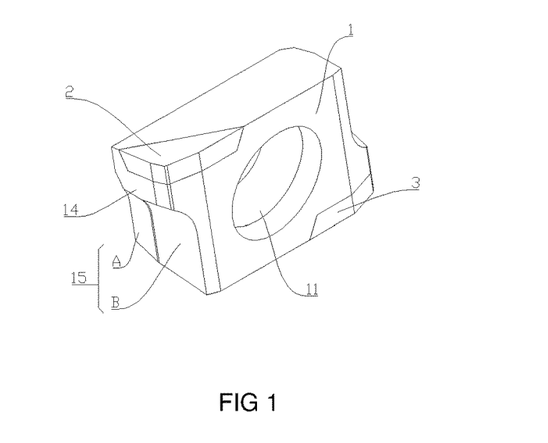
FIG. 1 is a first perspective view of a vertically-mounted milling cutter insert according to one embodiment of the invention.
Figure 2:
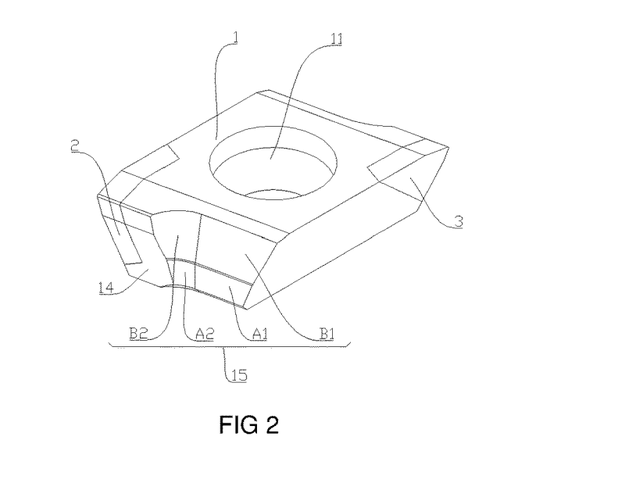
FIG. 2 is a second perspective view of a vertically-mounted milling cutter insert according to one embodiment of the invention.
Figure 3:
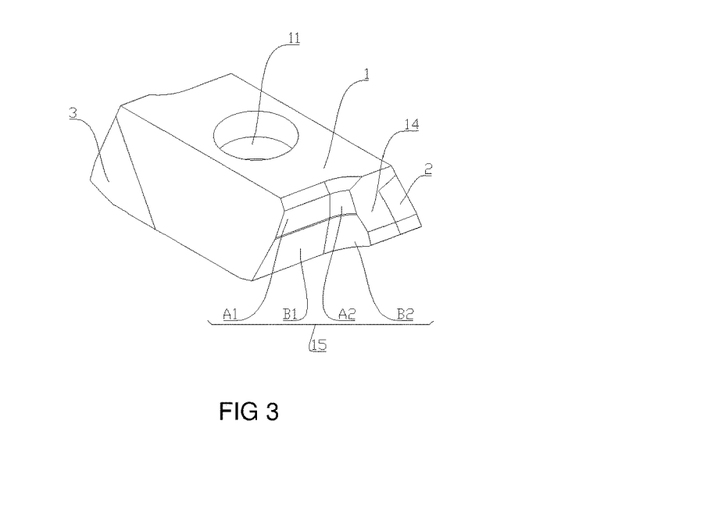
FIG. 3 is a third perspective view of a vertically-mounted milling cutter insert according to one embodiment of the invention.
Figure 4:
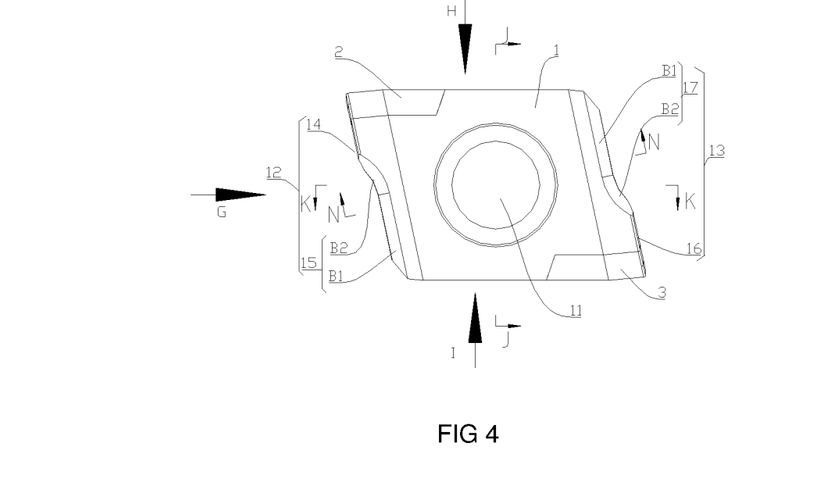
FIG. 4 is a front view of a vertically-mounted milling cutter insert according to one embodiment of the invention.

FIG. 1 is a first perspective view of a vertically-mounted milling cutter insert according to one embodiment of the invention, FIG. 2 is a second perspective view of a vertically-mounted milling cutter insert according to one embodiment of the invention, FIG. 3 is a third perspective view of a vertically-mounted milling cutter insert according to one embodiment of the invention, and FIG. 4 is a front view of a vertically-mounted milling cutter insert according to one embodiment of the invention. As shown in FIG. 1-FIG. 4, the vertically-mounted milling cutter insert in this embodiment includes a insert carbide base 1 and a double-cutter tips structure mounted on the insert base 1, wherein the double-cutter tips structure includes a first cutter tip 2 and a second cutter tip 3; the first cutter tip 2 and the second cutter tip 3 are both cutter tips for milling, thus the milling cutter insert in this embodiment may be an indexable milling cutter insert. In the central region of the insert base 1, there exists a mounting hole 11, which is configured for fitting the first locking screw 6 and mounting the vertically-mounted milling cutter insert in the milling cutter wheel.

As shown in FIG. 4, the cross section of the insert base 1 that is vertical to the axis of the mounting hole 11 is substantially a quadrangular cross section, that is, the overall outline of the cross section of the insert base 1 is a quadrangle. The first cutter tip 2 and the second cutter tip 3 are mounted on two opposite vertexes of the quadrangular insert base 1.

It may be conceivable according to the practical milling process that, in addition to the function of connecting the first cutter tip 2 with the second cutter tip 3, the insert base 1 further has the function of supporting the first cutter tip 2 and the second cutter tip 3 so as to transfer the impact force applied to the first cutter tip 2 or the second cutter tip 3 during the milling of a material surface to the milling cutter wheel. Therefore, the insert base 1 should have a supporting site for supporting the first cutter tip 2 and the second cutter tip 3. In order to guarantee that the first cutter tip 2 or the second cutter tip 3 will not vibrate during milling, the insert base 1 should further have a function of positioning.

As shown in FIG. 1-FIG. 4, the insert base of this embodiment has a first lateral side 12 and a second lateral side 13, wherein the first lateral side 12 and the second lateral side 13 are two opposite lateral sides on the insert base 1, the first lateral side 12 corresponds to the rear cutter face of the first cutter tip 2, and the part of the insert base 1 that forms the first lateral side 12 is connected with the first cutter tip 2 and functions to support the first cutter tip 2; the second lateral side 13 corresponds to the rear cutter face of the second cutter tip 3, and the part of the insert base 1 that forms the second lateral side 13 is connected with the second cutter tip 3 and functions to support the second cutter tip 3.

Specifically, the first lateral side 12 has a first cutter tip supporting surface 14 and a first positioning structure 15, wherein the first cutter tip supporting surface 14 is directly connected with the rear cutter face of the first cutter tip 2, and the first positioning structure 15 is recessed to the inside of the insert base 1 relative to the first cutter tip supporting surface 14. Similarly, the second lateral side 13 has a second cutter tip supporting surface 16 and a second positioning structure 17, wherein the second cutter tip supporting surface 16 is directly connected with the rear cutter face of the second cutter tip 3, and the second positioning structure 17 is recessed to the inside of insert base relative to the second cutter tip supporting surface 16.

As shown in FIG. 4, the first positioning structure 15 and the second positioning structure 17 are substantially located on the other two vertexes of the insert base 1 that has a quadrangular structure. In practical machining, the first positioning structure 15 and the second positioning structure 17 are the surfaces of the concave regions formed by removing the material on the other two vertexes of the insert base 1. Because the first positioning structure 15 is recessed relative to the first cutter tip supporting surface 14, during milling, the first positioning structure 15 will not be abraded as the rear cutter face region of the first cutter tip 2, and the positioning precision will not be affected by the machining process. Similarly, the second positioning structure 17 is recessed the second cutter tip supporting surface 16, thus during milling, the second positioning structure 17 will not be abraded as the rear cutter face region of the second cutter tip 3, and the positioning precision will not be affected by the machining process. In this way, when the first cutter tip 2 and the second cutter tip 3 are exchanged and used as the cutter tip of the milling cutter, the first positioning structure 15 and the second positioning structure 17 match the mounting hole 11 respectively for positioning, and hence the positioning accuracy and the positioning stability of the milling cutter insert can be guaranteed.

The vertically-mounted milling cutter insert in this embodiment is a recoverable milling cutter insert. The first cutter tip supporting surface 14 and the rear cutter face of the first cutter tip 2 are in the same plane, and the second cutter tip supporting surface 16 and the rear cutter face of the second cutter tip 3 are in the same plane. When the cutter tip of the milling cutter insert is abraded to a certain degree that requires sharpening, the first cutter tip supporting surface 14 and the rear cutter face of the first cutter tip 2 will be reground simultaneously, but the surface of the first positioning structure 15 will not be reground; similarly, the second cutter tip supporting surface 16 and the rear cutter face of the second cutter tip 3 will be reground simultaneously, but the second positioning structure 17 will not be reground. Therefore, the sharpening cost of the vertically-mounted milling cutter insert in this embodiment is low.

The first positioning structure 15 and the second positioning structure 17 in this embodiment both have a bent-plane structure, and different degrees of positioning may be realized by different surfaces in the bent-plane structure. Therefore, the specific shape of the bent-plane structure in this embodiment will be introduced by only taking the first positioning structure 15 as an example. As shown in FIG. 1-FIG. 3, the first positioning structure 15 in this embodiment includes a first plane A and a second plane B, wherein the first plane A and the second plane B are noncoplanar. Wherein, the first plane A is configured for fitting the first positioning plane of the multitooth milling cutter below, and the second plane B is configured for fitting the conical surface of a second locking screw 7 to adjust the location of the milling cutter insert; when the second plane B fits the second locking screw 7, the first plane A is detached from the first positioning plane 47 on the cutter wheel.

The second plane B in this embodiment is the surface that is inclined to the inside of the insert base 1 relative to the first plane A. As shown in FIG. 2 and FIG. 3, the first plane A in this embodiment has a first flat surface A1 and a first curved surface A2, and the first curved surface A2 connects the first flat surface A1 with the first cutter tip supporting surface 14; the second plane B has a second flat surface B1 and a second curved surface B2, and the second curved surface B2 connects the second flat surface B1 with the first cutter tip supporting surface 14. In this embodiment, the first curved surface A2 is set as a transitional curved surface between the first cutter tip supporting surface 14 and the first flat surface A1, thus the problem of local stress concentration may be avoided in this region, and the insert base may be prevented from being damaged. Moreover, the second curved surface B2 in this embodiment is a conical surface with an axis parallel to the axis of the mounting hole, and in addition to reducing the problem of stress concentration, the second curved surface B2 may also increase the contact area with the second locking screw 7 that will be described below.

Figure 5:
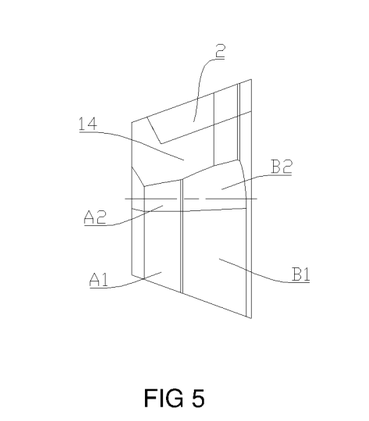
FIG. 5 is schematic diagram in direction G of FIG. 4.
Figure 6:
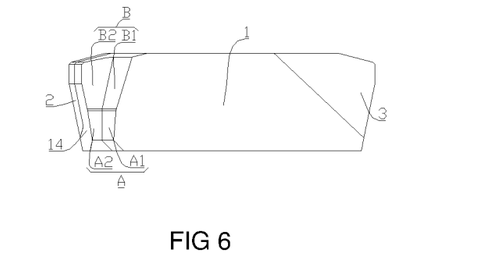
FIG. 6 is a schematic diagram in direction I of FIG. 4.
Figure 7:
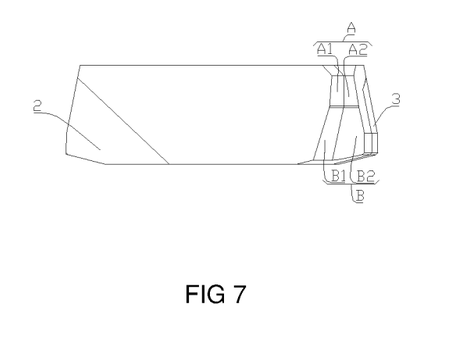
FIG. 7 is a schematic diagram in direction H of FIG. 4.

FIG. 5 is schematic diagram in direction G of FIG. 4, FIG. 6 is a schematic diagram in direction I of FIG. 4, and FIG. 7 is a schematic diagram in direction H of FIG. 4. It may be shown from FIG. 5 that, the first curved surface A2 in this embodiment is also a conical surface with an axis parallel to the axis of the mounting hole, except that the conical degree of the first curved surface A2 is smaller than that of the second curved surface B2. It may be conceived from FIG. 2, FIG. 3 and FIG. 5 that, the angle of the first flat surface A1 relative to the axis of the mounting hole 11 is the conical degree of the first curved surface A2, and the angle of the second flat surface B1 relative to the axis of the mounting hole 11 is the conical degree of the second curved surface B2.

It may be shown from FIG. 6 and FIG. 7 that, as similar to the first positioning structure 15 on the first lateral side 12, the second positioning structure 17 on the second lateral side 13 in this embodiment also has a first flat surface A1, a first curved surface A2, a second flat surface B1 and a second curved surface B2. Additionally, it may be shown from FIG.

4-FIG. 7 that, the milling cutter insert in this embodiment is centrosymmetric relative to the axis of the mounting hole 11.

Figure 8:
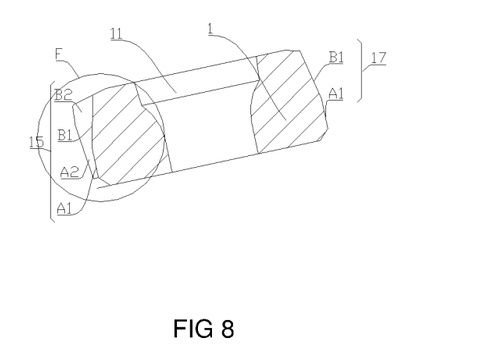
FIG. 8 is a cross-sectional view along N-N in FIG. 4.
Figure 9:
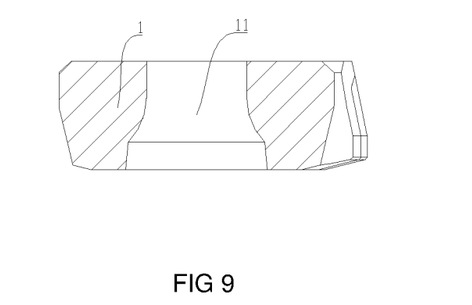
FIG. 9 is a cross-sectional view along K-K in FIG. 4.
Figure 10:
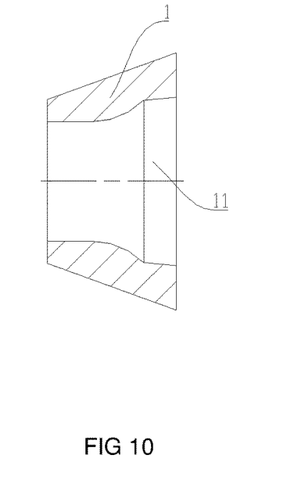
FIG. 10 is a cross-sectional view along J-J in FIG. 4.

FIG. 8 is a cross-sectional view along N-N in FIG. 4, FIG. 9 is a cross-sectional view along K-K in FIG. 4, and FIG. 10 is a cross-sectional view along J-J in FIG. 4. It may be shown from FIG. 8-FIG. 10 that, the region of the mounting hole part in this embodiment is a tapered hole, which facilitates the fitting with the positioning plane of the positioning screw for realizing the mounting positioning of the milling cutter insert.

Figure 11:
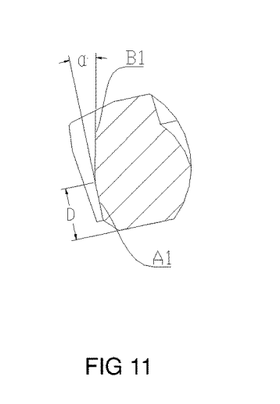
FIG. 11 is a schematic diagram of region F in FIG. 8.

FIG. 11 is a schematic diagram of region F in FIG. 8. It may be shown from FIG. 11 that, the width of the first plane A in the thickness direction of the insert base is D. In this embodiment, the width D of the first plane is ⅓-½ of the thickness of the insert base. In addition, it may also be shown from FIG. 11 that, the angle between the first plane A and the second plane B is a. In one specific application, a may be 10° 30°, and preferably, 12.5°.

In one specific application, the insert base 1 in this embodiment may preferably employ hard alloy steel, and the first cutter tip 2 and the second cutter tip 3 may preferably employ Polycrystalline Diamond (PCD) or Polycrystalline Cubic Boron Nitride (PCBN).

In addition, the front cutter faces of the first cutter tip 2 and the second cutter tip 3 may be set with a design of chip breaking, by which the milling chipping is broken.

In addition to the above vertically-mounted milling cutter insert, one embodiment of the invention further provides a multitooth milling cutter employing the above vertically-mounted milling cutter insert.

Figure 12:
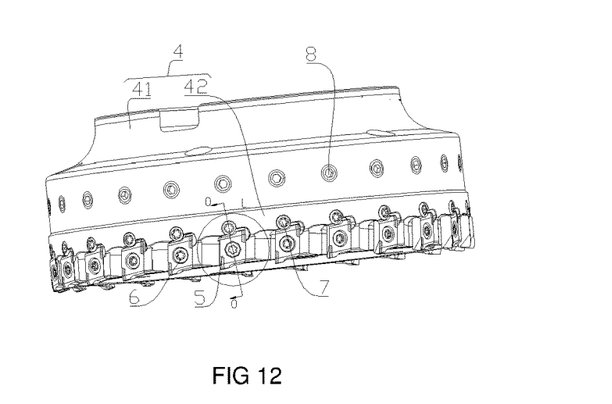
FIG. 12 is a schematic view of a multitooth milling cutter according to one embodiment of the invention.
Figure 13:
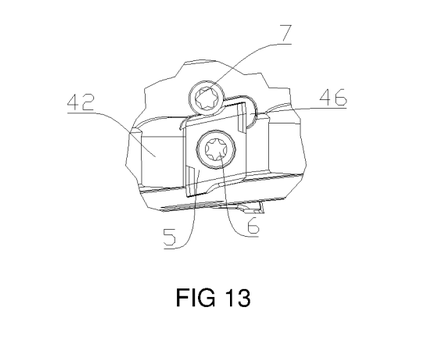
FIG. 13 is an enlarged view of region L in FIG. 12.

FIG. 12 is a schematic view of a multitooth milling cutter according to one embodiment of the invention, and FIG. 13 is an enlarged view of region L in FIG. 12. As shown in FIG. 12 and FIG. 13, the multitooth milling cutter in this embodiment includes a cutter wheel base 4, a vertically-mounted milling cutter insert 5, a first locking screw 6, a second locking screw 7 and a dynamic balance adjusting screw 8.

Figure 14:
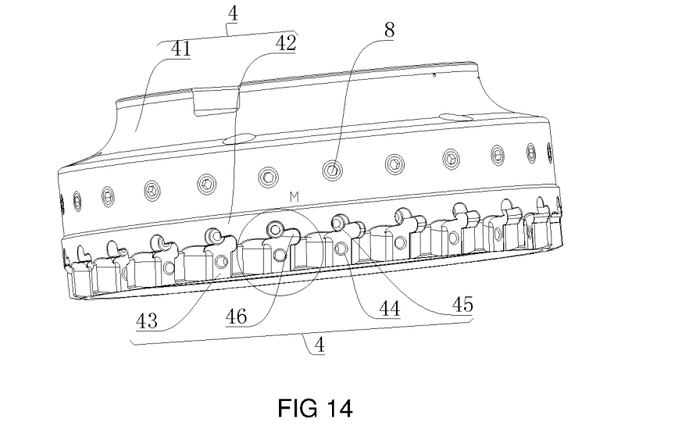
FIG. 14 is a schematic view of a cutter wheel base according to one embodiment of the invention.
Figure 15:
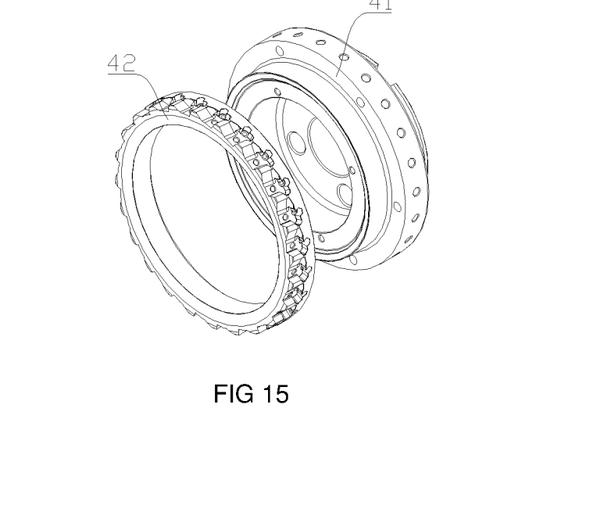
FIG. 15 is an exploded view of the first cutter base and the second cutter base in the cutter wheel base according to one embodiment of the invention.
Figure 16:
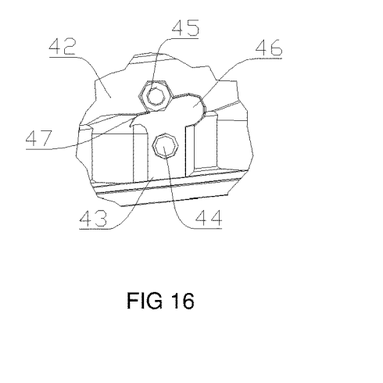
FIG. 16 is an enlarged view of region M in FIG. 14.

FIG. 14 is a schematic view of a cutter wheel base according to one embodiment of the invention, FIG. 15 is an exploded view of the first cutter base and the second cutter base in the cutter wheel base according to one embodiment of the invention, and FIG. 16 is an enlarged view of region M in FIG. 14. It may be shown from FIG. 14-FIG. 16 that, the cutter wheel base 4 includes a first cutter base 41 and a second cutter base 42, wherein the first cutter base 41 and the second cutter base 42 are connected fixedly, the first cutter base 41 is connected with the driving shaft of a machine via a cutter shank, and the second cutter base 42 is configured for mounting the vertically-mounted milling cutter insert 5.

When the multitooth milling cutter mills the surface of a material, the stress applied to the second cutter base 42 by the vertically-mounted milling cutter insert 5 is very big. In order to prevent the second cutter base 42 from being deformed, the material of the second cutter base 42 in this embodiment is preferably a hard material such as steel; at the same time, in order to reduce the weight of the multitooth milling cutter, the material of the first cutter base 41 is preferably a light alloy, for example, aluminium alloy or titanium alloy. Thus, the hardness of the first cutter base 41 in this embodiment is smaller than that of the second cutter base 42.

As shown in FIG. 15, the second cutter base 42 in this embodiment is in the form of a circular ring, the bottom of the first cutter base 41 has a shaft-shoulder structure, and the second cutter base 42 is fixedly mounted on the shaft-shoulder structure of the first cutter base 41. However, in other embodiments, the second cutter base 42 may also be in fitted connection with the end face of the first cutter base 41, and the end face of the first cutter base 41 is utilized as the positioning plane of the second cutter base 42.

As shown in FIG. 14 and FIG. 16, the second cutter base 42 has a structure for mounting and positioning the vertically-mounted milling cutter insert 5. Specifically, the surface of the second cutter base 42 is set with a insert mounting groove 43 in which the vertically-mounted milling cutter insert 5 may be mounted; the bottom side of the insert mounting groove 43 is set with a first screw hole 44 for fitting the first locking screw 6; the lateral side of the insert mounting groove 43 is further set with a first positioning plane 47; the region of the second cutter base 42 that is adjacent to the first positioning plane 47 is set with a second screw hole 45 that fits the second locking screw 7, and the axis of the second screw hole 45 is parallel to the axis of the first screw hole 44; in addition, there further exists an empty groove 46 in communication with the insert mounting groove.

When the vertically-mounted milling cutter insert 5 with a double-cutter tips structure is mounted in the insert mounting groove 43, one of the first cutter tip 2 and the second cutter tip 3 projects from the second cutter base 42, and the other is placed in the empty groove 46 without contacting the lateral side of the empty groove 46. The first locking screw 6 passes through the mounting hole 11 and fixes the vertically-mounted milling cutter insert 5 in the mounting groove; at the same time, the first positioning plane 47 or the second locking screw 7 fits the corresponding positioning structure in the vertically-mounted milling cutter insert 5, thereby realizing positioning.

Figure 17:
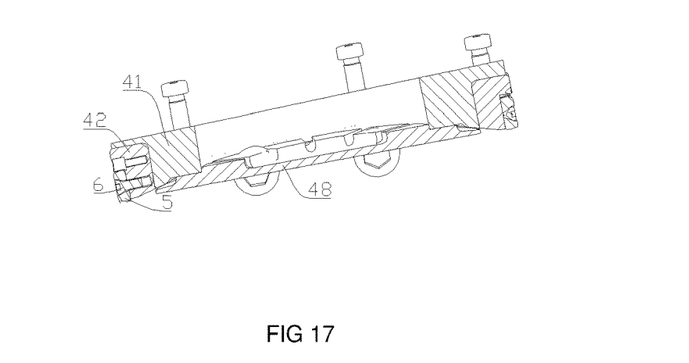
FIG. 17 is a schematic diagram showing the cross section O-O in FIG. 12 on which the second positioning screw is not mounted.

FIG. 17 is a schematic diagram showing the cross section O-O in FIG. 12 on which no second positioning screw is mounted. As shown in FIG. 17, in the case that the requirement on the machining precision of the multitooth milling cutter is not very high, the first plane A in the vertically-mounted milling cutter insert 5 may be directly applied to the first positioning plane 47 of the first cutter base 41, and the vertically-mounted milling cutter insert 5 may be fixed via the fitting of the first positioning plane 47 and the first locking screw 6; at this point, the second locking screw 7 may not be mounted in the second screw hole 45, or, it may be mounted in the second screw hole 45 and only function as a counterweight.

Figure 18:
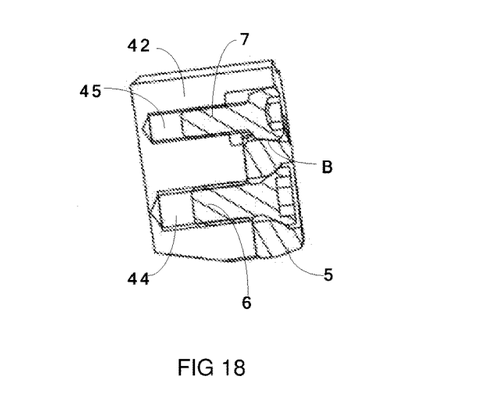
FIG. 18 is a cross-sectional view when the second positioning screw fits the second plane.
Figure 19:
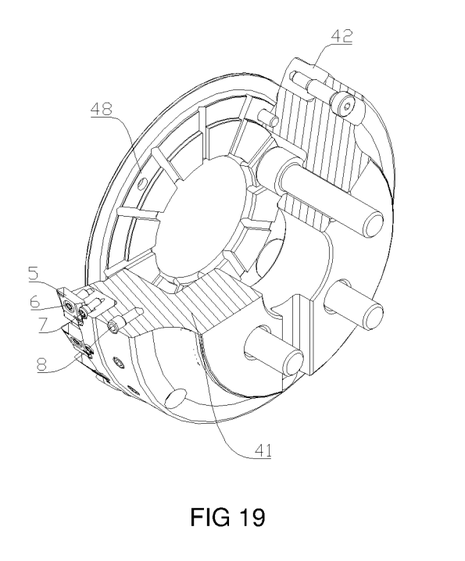
FIG. 19 is a partial cut-away view of a multitooth milling cutter insert according to one embodiment of the invention.

In the case that the requirement on the machining precision of the multitooth milling cutter is very high, due to various errors, the cutter tips of each vertically-mounted milling cutter insert 5 that project from the second cutter base 42 are not in the same plane. At this point, the size of the vertically-mounted milling cutter insert 5 that projects from the second cutter base 42 may be adjusted by fitting the second positioning screw 7 and the second plane B in the vertically-mounted milling cutter insert 5, thus each cutter tip may be leveled. FIG. 18 is a cross-sectional view when the second positioning screw fits with the second plane. As shown in FIG. 18, the second locking screw 7 fits the second plane B via the conical surface. If adjustment is required, when the second locking screw 7 is screwed into the second screw hole 45, the conical surface of the second locking screw 7 presses the second plane B outward to make the vertically-mounted milling cutter insert 5 moves outward as a whole. During adjustment, the first locking screw 6 should be unscrewed first, so that the vertically-mounted milling cutter insert may move outward FIG. 19 is a partial cut-away view of a multitooth milling cutter insert according to one embodiment of the invention. FIG. 19 also shows the fitting of the second locking screw 7 and the second plane B in the vertically-mounted milling cutter insert 5. Additionally, it may be shown from FIG. 19 that, the multitooth milling cutter in this embodiment is further set with a coolant liquid spray plate 48, which is connected fixedly with the first cutter base 41 and has a certain gap with the second cutter base 42. A guiding groove is set on the coolant liquid spray plate 48. After a coolant liquid is fed to the coolant liquid spray plate 48 via the axle center of the first cutter base 41, it will be flicked out from the gap after being accelerated and centrifugated by the guiding groove.

In addition, the dynamic balance adjusting screw 8 in this embodiment is mounted on the outer circumferential surface of the first cutter base 41. After each vertically-mounted milling cutter insert 5, the first locking screw 6 and the second locking screw 7 are mounted, if the gravity center of the multitooth milling cutter is not at the axle center, it may be adjusted to the axle center by changing the location of each dynamic balance adjusting screw 8.

The vertically-mounted milling cutter insert and the multitooth milling cutter according to the embodiments of the invention have been introduced in detail above.

The principles and implementation modes of the invention have been illustrated by specific embodiments in this part, and the illustration of the above embodiments is only used for better understanding the core concept of the invention. Other embodiments obtained without creative work by one skilled in the art without departing from the principles of the invention all pertain to the protection scope of the invention.

What is claimed is:

1. A vertically-mounted milling cutter insert, comprising: a insert base and a cutter tip unit, wherein the insert base is set with a mounting hole for mounting the vertically-mounted milling cutter insert onto a milling cutter wheel, the cutter tip unit is mounted on the insert base, and the cutter tip unit has a double-cutter tip structure;
   wherein the double-cutter tip structure comprises a first cutter tip and a second cutter tip, the cross section of the insert base that is vertical to the axis of the mounting hole has four vertexes, and the first cutter tip and the second cutter tip are set on two vertexes on the insert base with locations corresponding to each other;
   wherein the insert base has a first lateral side and a second lateral side opposite to the first lateral side; the first lateral side is set with a first cutter tip supporting surface and a first positioning structure; the first positioning structure is recessed to the inside of the insert base relative to the first cutter tip supporting surface; the second lateral side is set with a second cutter tip supporting surface and a second positioning structure; the second positioning structure is recessed to the inside of the insert base relative to the second cutter tip supporting surface.

2. The vertically-mounted milling cutter insert according to claim 1, wherein the first positioning structure and the second positioning structure both have a bent-plane structure.

3. The vertically-mounted milling cutter insert according to claim 2, wherein the bent-plane structure comprises a first plane and a second plane, wherein the second plane is inclined to the inside of the insert base relative to the first plane.

4. The vertically-mounted milling cutter insert according to claim 3, wherein the first plane has a first flat surface and a first curved surface; the first curved surface in the first positioning structure is located between the first cutter tip supporting surface and the first flat surface in the first positioning structure; the first curved surface in the second positioning structure is located between the second cutter tip supporting surface and the first flat surface in the second positioning structure; the second plane has a second flat surface and a second curved surface; the second curved surface in the first positioning structure is located between the first cutter tip supporting surface and the second flat surface in the first positioning structure; the second curved surface in the second positioning structure is connected between the second cutter tip supporting surface and the second flat surface in the second positioning structure.

5. The vertically-mounted milling cutter insert according to claim 4, wherein the second curved surface is a conical surface with the axis parallel to the axis of the mounting hole.

6. The vertically-mounted milling cutter inserts according to claim 3, wherein the width of the first plane is ⅓-½ of the base thickness; and/or, the angle between the second plane and the first plane is 10°-30°.

7. A multitooth milling cutter, comprising: a cutter wheel base, a screw assembly and a vertically-mounted milling cutter insert; the cutter wheel base comprises a first cutter base and a second cutter base, wherein the first cutter base is connected with the second cutter base, and the vertically-mounted milling cutter insert is set on the second cutter base; the vertically-mounted milling cutter insert comprises a insert base and a cutter tip unit, wherein the insert base is set with a mounting hole for mounting the vertically-mounted milling cutter insert onto a milling cutter wheel, the cutter tip unit is mounted on the insert base, and the cutter tip unit has a double-cutter tip structure;
   the screw assembly comprises an adjusting screw adjusting screw and a mounting and positioning screw set, wherein the dynamic balance adjusting screw is set on the first cutter base, and the vertically-mounted milling cutter insert is connected with the second cutter base via the mounting and positioning screw set;
   the second cutter base comprises: a insert mounting groove for mounting the vertically-mounted milling cutter insert, a first screw hole set on the bottom side of the insert mounting groove, and an alternate groove in communication with the insert mounting groove;
   when the vertically-mounted insert is mounted in the insert mounting groove, an unused cutter tip structure is located in the empty groove; the positioning structure includes a first positioning plane located on the lateral side of the insert mounting groove and a second locking screw mounted on the lateral side of the insert mounting groove; the cutter wheel base comprises a second screw hole fitting the second locking screw; the axis of the second screw hole is parallel to the axis of the first screw hole.

8. The multitooth milling cutter according to claim 7, wherein the double-cutter tip structure comprises a first cutter tip and a second cutter tip, the cross section of the insert base that is vertical to the axis of the mounting hole has four vertexes, and the first cutter tip and the second cutter tip are set on two vertexes on the insert base with locations corresponding to each other.

9. The multitooth milling cutter according to claim 8, wherein the insert base has a first lateral side and a second lateral side opposite to the first lateral side; the first lateral side is set with a first cutter tip supporting surface and a first positioning structure; the first positioning structure is recessed to the inside of the insert base relative to the first cutter tip supporting surface; the second lateral side is set with a second cutter tip supporting surface and a second positioning structure; the second positioning structure is recessed to the inside of the insert base relative to the second cutter tip supporting surface.

10. The multitooth milling cutter according to claim 9, wherein the first positioning structure and the second positioning structure both have a bent-plane structure.

11. The multitooth milling cutter according to claim 10, wherein the bent-plane structure comprises a first plane and a second plane, wherein the second plane is inclined to the inside of the insert base relative to the first plane.

12. The multitooth milling cutter according to claim 11, wherein the first plane has a first flat surface and a first curved surface; the first curved surface in the first positioning structure is located between the first cutter tip supporting surface and the first flat surface in the first positioning structure; the first curved surface in the second positioning structure is located between the second cutter tip supporting surface and the first flat surface in the second positioning structure; the second plane has a second flat surface and a second curved surface; the second curved surface in the first positioning structure is located between the first cutter tip supporting surface and the second flat surface in the first positioning structure; the second curved surface in the second positioning structure is connected between the second cutter tip supporting surface and the second flat surface in the second positioning structure.

13. The multitooth milling cutter according to claim 12, wherein the second curved surface is a conical surface with the axis parallel to the axis of the mounting hole.

14. The multitooth milling cutter according to claim 11, wherein the width of the first plane is ⅓-½ of the base thickness; and/or, the angle between the second plane and the first plane is 10°-30°.

* * * * *